United States Patent [19]

Schubart et al.

[11] 4,369,122
[45] Jan. 18, 1983

[54] VULCANIZATION ACCELERATION BASED ON MELAMINE DERIVATIVES, RUBBER COMPOSITIONS CONTAINING MELAMINE DERIVATIVES, AND A PROCESS FOR THE VULCANIZATION OF RUBBER

[75] Inventors: Rüdiger Schubart, Bergisch-Gladbach; Ulrich Eholzer, Cologne, both of Fed. Rep. of Germany

[73] Assignee: Bayer Aktiengesellschaft, Leverkusen, Fed. Rep. of Germany

[21] Appl. No.: 234,944

[22] Filed: Feb. 17, 1981

[30] Foreign Application Priority Data

Feb. 23, 1980 [DE] Fed. Rep. of Germany ....... 3006803

[51] Int. Cl.$^3$ ................... C08K 5/34; C08K 5/47; C07D 251/70
[52] U.S. Cl. .................... 252/182; 260/786; 260/791; 525/347; 544/196
[58] Field of Search .................. 252/182; 525/347; 544/196; 260/786, 791

[56] References Cited

U.S. PATENT DOCUMENTS

| | | | |
|---|---|---|---|
| 2,210,831 | 8/1940 | Bock et al. | 544/194 |
| 3,143,548 | 8/1964 | Vail et al. | 544/196 |
| 3,290,307 | 12/1966 | Keller et al. | 544/196 |
| 3,369,004 | 2/1968 | Stanton | 525/347 |
| 3,755,322 | 8/1973 | Winter et al. | 544/196 |
| 3,824,232 | 7/1974 | Pusch et al. | 544/196 |
| 3,969,353 | 7/1976 | Schwarze et al. | 525/347 |

*Primary Examiner*—Irwin Gluck
*Attorney, Agent, or Firm*—Connolly and Hutz

[57] ABSTRACT

Vulcanization accelerators based on
(a) melamine derivatives, optionally in combination with
(b) conventional vulcanization accelerators taken from the group of thiazole accelerators, and optionally
(c) other conventional accelerators, a rubber composition containing said accelerator and a process for vulcanizing rubber.

2 Claims, No Drawings

VULCANIZATION ACCELERATION BASED ON MELAMINE DERIVATIVES, RUBBER COMPOSITIONS CONTAINING MELAMINE DERIVATIVES, AND A PROCESS FOR THE VULCANIZATION OF RUBBER

This invention relates to vulcanization accelerators based on melamine derivatives, optionally in combination with thiazole accelerators and other conventional accelerators, rubber compositions containing melamine derivatives, and a process for the vulcanization of rubbers, using melamine derivatives, optionally in combination with thiazole accelerators and other conventional accelerators, as vulcanization accelerators.

It is known in the art to use basic accelerators, alone or preferably in combination with thiazole accelerators such as 2-mercaptobenzothiazole (MBT), 2-mercaptobenzothiazyl disulphide (MBTS) or 2-benzothiazyl-cyclohexyl-sulphenamide (CBS), for the sulphur vulcanization of diene rubbers. The following are examples of basic accelerators used in practice: diphenyl-guanidine (DPG), di-o-tolyl guanidine (DOTG) and hexamethylene-tetramine (HEXA) (see "Ullmann's Enzyklopädie der Technischen Chemie", 4th Edition, Volume 13, page 641 et seq.) Less effective than the above mentioned products are simple amines such as dibutylamine.

DPG, DOTG and HEXA have the following disadvantages. For the industrial production of DPG and DOTG, it is necessary to use an extremely toxic material, hydrocyanic acid, as a starting material as well as the highly toxic substance, cyanogen chloride, as an intermediate stage (see "Ullmann's Enz. der Techn. Chemie", 4th Edition, Volume 12, page 416 et seq.) This gives rise to considerable problems and necessitates elaborate safety precautions. DOTG is relatively toxic (see J. Ind. Hyg. a. Tox. 13, 87, 1931) while HEXA has a highly irritant effect on the skin (see "J. Am. Med. Ass." 128, 1209, 1945). DPG, DOTG and HEXA cause discolourations in pale or transparent mixtures.

It has now been found that melamine derivatives corresponding to the general formula (I):

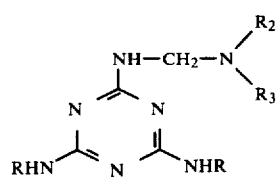
(I)

wherein
R denotes hydrogen or the group

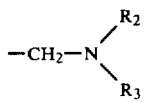

and mixtures are suitable as vulcanization accelerators for the sulphur vulcanization of diene rubbers.

They are free from the above mentioned disadvantages. Neither hydrocyanic acid nor cyanogen chloride are used for their preparation. The compounds have little toxicity and no irritant effect on the skin and can easily be prepared from melamine, formaldehyde and corresponding amines. They do not discolour the vulcanizates.

This invention thus provides vulcanization accelerators based on melamine derivatives corresponding to the general formula (I):

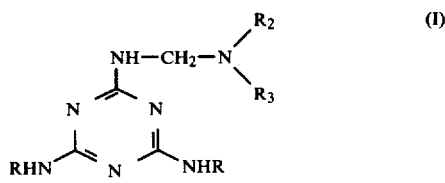
(I)

wherein
each R independently denotes hydrogen or the group

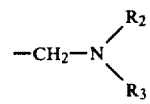

and $R_2$ and $R_3$, which may be identical or different, denote hydrogen, a straight chain or branched chain $C_1$–$C_4$ alkyl or alkenyl group or a $C_3$–$C_7$, preferably a $C_5$–$C_6$ cycloalkyl group, and $R_2$ and $R_3$ may also be linked through a $C_2$–$C_{12}$. preferably a $C_2$–$C_6$ alkylene bridge which may contain a hetero atom such as oxygen, sulphur or N-$C_1$–$C_4$, preferably $C_1$ alkyl, optionally in combination with conventional vulcanization accelerators taken from the group of thiazole accelerators and optionally other conventional accelerators. Where R denotes hydrogen or

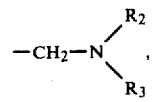

the compounds may belong to the following classes of compounds:

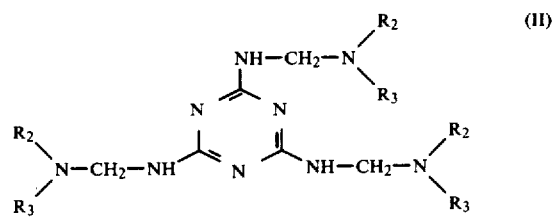
(II)

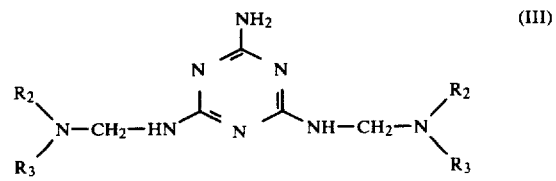
(III)

-continued

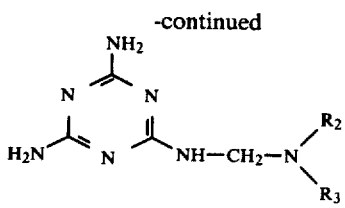
(IV)

R preferably denotes the group

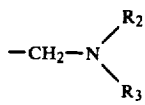

$R_2$ and $R_3$ preferably have the following meaning: methyl, ethyl, n-propyl, iso-propyl, n-butyl, iso-butyl, sec-butyl, tertiary butyl, propenyl and butenyl, a tetramethylene, pentamethylene, hexamethylene, oxadiethylene, thiadiethylene and N-alkylazadiethylene bridge in which the N-alkyl group may be methyl, ethyl, propyl or n-butyl.

The following compounds are mentioned as examples:

tris-(dimethylamino-methylene)-melamine
tris-(diethylamino-methylene)-melamine
tris-(di-n-propylamino-methylene)-melamine
tris-(di-iso-propylamino-methylene)-melamine
tris-(di-n-butylamino-methylene)-melamine
tris-(di-iso-butylamino-methylene)-melamine
tris-(di-sec-butylamino-methylene)-melamine
tris-(di-tert-butylamino-methylene)-melamine
tris-(methyl-cyclohexylamino-methylene)-melamine
tris-(ethyl-cyclohexylamino-methylene)-melamine
tris-(n-propyl-cyclohexylamino-methylene)-melamine
tris-(methyl-allylamino-methylene)-melamine
tris-(ethyl-allylamino-methylene)-melamine
tris-(di-allylamino-methylene)-melamine
tris-(n-butylamino-methylene)-melamine
tris-(tert-butylamino-methylene)-melamine
tris-(di-n-butyleneamino-methylene)-melamine
tris-(di-cyclohexylamino-methylene)-melamine
tris-(di-cyclopentylamino-methylene)-melamine
tris-(di-cycloheptylamino-methylene)-melamine
tris-(methyl-isopropylamino-methylene)-melamine
tris-(ethyl-isopropylamino-methylene)-melamine
tris-(methyl-tert-butylamino-methylene)-melamine
tris-(ethyl-tert-butylamino-methylene)-melamine
tris-(methyl-cyclohexanylamino-methylene)-melamine
tris-(cyclohexanylamino-methylene)-melamine
tris-(pyrrolidino-methylene)-melamine
tris-(piperidino-methylene)-melamine
tris-(hexamethyleneimino-methylene)-melamine
tris-(oxadiethyleneimino-methylene)-melamine
tris-(thiadiethyleneimino-methylene)-melamine
tris-(N-methyldiethyleneimino-methylene)-melamine
tris-(cyclohexylamino-methylene)-melamine
di-(methyl-cyclohexylamino-methylene)-melamine
di-(cyclohexylamino-methylene)-melamine
di-(tert.-butylamino-methylene)-melamine
dicyclohexylamino-methylene-melamine
di-(dimethylamino-methylene)-melamine Mixtures of melamine derivatives may, of course, also be used.

The following are preferred: tris-(diethylamino-methylene)-melamine, tris-(dimethylamino-methylene)-melamine (hereinafter referred to as MFD), and tris-(pyrrolidyl-methylene)-melamine.

MFD, which is the substance preferably used, is relatively non-toxic, its $LD_{50}$ value (rats, per os) is 1,900 mg/kg and it has no irritating effect on the skin, mucous membranes or eyes. It does not discolour the vulcanizates.

The compounds corresponding to the general formula (I) may be used alone but they are preferably used in combination with conventional vulcanization accelerators.

The compounds mentioned above may be prepared by a method analogous to that of U.S. Pat. No. 2,210,831, by mixing melamine, formaldehyde and amine in water, optionally with the introduction of gaseous components. The reaction temperature is generally from 0° to 100° C.

The accelerators are advantageously used in the following quantities (phr, parts by weight based on 100.0 parts by weight of rubber):

(a) melamine derivatives corresponding to the general formula (I): approximately 0.05–5, preferably 0.1–2.0 phr;

(b) thiazole accelerators: approximately 0–5, preferably 0.3–2.0 phr;

(c) other conventional accelerators: approximately 0–2, preferably 0.01–1.0 phr.

The following are examples of thiazole accelerators (b) (see list of abbreviations in Table I): MBT, MBTS, ZMBT, CBS, TBBS, MBS and DCBS.

The following are examples of conventional accelerators (c): TMTD, TMTM, ZDEC and OTOS.

The quantity of sulphur used for vulcanization is generally from 0.2 to 4 parts by weight per 100 parts by weight of rubber.

Sulphur donors such as N,N'-dithio-bis-morpholine, dipentamethylene-thiuramic tetrasulphide, N,N'-dithio-bis-hexahydro-2H-azepinone-(2) and 2-benzothiazyl-dithio-N-morpholide may be used in the usual quantities.

The accelerators and accelerator combinations according to the invention are suitable for the vulcanization of diene rubbers. The invention therefore also relates to diene rubber compositions containing the accelerator (combination) according to the invention in addition to the usual components of the mixture and to a process for the vulcanization of diene rubbers using the accelerators or accelerator combinations according to the invention.

The following diene rubbers are suitable: styrene-butadiene rubber (SBR), natural rubber (NR), nitrile rubber (NBR), polybutadiene (BR), polyisoprene (IR) and polychloroprene (CR).

Mixtures of various diene rubbers may also be used.

The indiviaul components of the accelerator system may be added to the diene rubbers or rubber mixture before vulcanization, either separately or in the form of a mixture or a preliminary mixture of rubber and accelerator (see Ullmann's Enzykl. d. Techn. Chemie, 3rd Edition, published by Urban & Schwarzenberg, Munich-Berlin 1957, Volume 9, page 364).

The diene rubbers may contain all the usual additives such as fillers, in particular carbon blacks, mineral oils, plasticizers, substances which render the rubbers adhesive, accelerator activators, in particular stearic acid, waxes, age protective agents, ozone protective agents, blowing agents, dyes and pigments.

Fillers such as the types of carbon black used in the rubber processing industry, silica, particularly finely divided silica obtained in the gaseous phase and hydrophobic silica, and finely divided metal oxides, including mixed oxides and oxide mixtures, are valuable components for a mixture.

Vulcanization of the diene rubbers is general carried out at temperatures within the range of about 100° C. to about 300° C., perferably at 140°-240° C. Any of the usual industrial vulcanization processes may be employed, such as heating in a press or heating with superheated steam, hot air, a salt bath, a fluidized bed, ultra-high frequency and a steam pipe.

The data given in the Examples which follow were obtained as follows:

Rubber mixtures were prepared in an internal mixer in the usual manner from the test formulations indicated. Sulphur and vulcanization accelerator were mixed again on rollers. Test flaps 4 mm in thickness were produced from the mixtures by pressure vulcanization (step-wise heating at the temperatures indicated in the Examples). The individual data were obtained by the test methods indicated in Table 1. The abbreviations used are also summarized in Table 1.

EXAMPLE 1

(phr = parts by weight based on 100 parts by weight of rubber)

|  | phr |
| --- | --- |
| Natural rubber (smoked sheets) | 100.0 |
| Carbon black N 330 (HAF) | 45.0 |
| Zinc oxide | 5.0 |
| Stearic acid | 3.0 |
| aromatic mineral oil | 2.5 |
| naphthenic mineral oil | 2.5 |
| TMQ | 1.0 |
| IPPD | 1.5 |
| sulphur | 2.35 |

| Vulcameter | HEXA 1.0 phr | MFD 1.0 phr |
| --- | --- | --- |
| prevulcanization time | | |
| $t_s$ (15) 120° C. | above 30 | above 30 |
| $t_s$ (15) 130° C. | above 30 | 21.3 |
| Flow time $t_s$ (15) 150° C. | 5.9 | 4.9 |
| final vulcanization time | | |
| $t_{90}$/150° C. | 24.5 | 22.7 |
| reaction time | | |
| $t_{90}$-$t_s$/150° C. | 18.6 | 17.8 |
| final vulcanization time | | |
| $t_{90}$/180° C. | 3.4 | 3.4 |
| Stepwise heating | | |
| M 300 150° C./10 min. | 3.3 | 4.1 |
| 20 min. | 4.9 | 6.5 |
| 30 min. | 6.2 | 7.7 |
| 45 min. | 7.4 | 9.0 |
| F 150° C./30 min. | 22.2 | 22.9 |
| D 150° C./30 min. | 605 | 605 |
| H 150° C./30 min. | 54 | 59 |
| E 150° C./30 min. | 49 | 51 |

The accelerator MFD according to the invention is found to have the following advantages over HEXA which is used for comparison: a shorter final vulcanization time $t_{90}$, a shorter reaction time $t_{90}$-$t_s$, higher tension values $M_{300}$ and a higher hardness H. The elasticity E is also slightly higher.

EXAMPLE 2

(formulation as indicated in Example 1)

|  | HEXA 0.5 phr<br>MBTS 0.5 phr | MFD 0.5 phr<br>MBTS 0.5 phr |
| --- | --- | --- |
| Vulkameter | | |
| prevulcanization time | | |
| $t_s$ (15) 120° C. | 17.5 | 13.5 |
| $t_s$ (15) 130° C. | 9.2 | 7.1 |
| flow time $t_s$ (15)/150° C. | 3.3 | 2.8 |
| final vulcanization time | | |
| $t_{90}$/150° C. | 13.5 | 10.2 |
| reaction time | | |
| $t_{90}$-$t_s$/150° C. | 10.2 | 7.4 |
| final vulcanization time | | |
| $t_{90}$/180° C. | 2.7 | 2.4 |
| Stepwise heating | | |
| M 300 150° C./10 min. | 8.9 | 10.1 |
| 20 min. | 9.6 | 10.4 |
| 30 min. | 9.1 | 9.7 |
| 45 min. | 8.2 | 8.6 |
| F 150° C./30 min. | 24.5 | 23.7 |
| D 150° C./30 min. | 590 | 590 |
| H 150° C./30 min. | 60 | 64 |
| E 150° C./30 min. | 53 | 54 |

The accelerator MFD according to the invention used in combination with MBTS is found to have the following advantages over the comparison combination, HEXA/MBTS: a shorter prevulcanization time $t_{90}$, a shorter reaction time $t_{90}$-$t_s$, higher tension values $M_{300}$ and a higher hardness H.

EXAMPLE 3

(formulation as indicated in Example 1)

|  | HEXA 0.5 phr<br>MBT 0.5 phr | MFD 0.5 phr<br>MBT 0.5 phr |
| --- | --- | --- |
| Vulkameter | | |
| prevulcanization time | | |
| $t_s$ (15) 120° C. | 12.8 | 9.7 |
| $t_s$ (15) 130° C. | 6.8 | 5.6 |
| flow time $t_s$ (15)/150° C. | 2.4 | 2.2 |
| final vulcanization time | | |
| $t_{90}$/150° C. | 11.8 | 9.1 |
| reaction time $t_{90}$-$t_s$/150° C. | 9.4 | 6.9 |
| final vulcanization time | | |
| $t_{90}$/180° C. | 2.5 | 2.3 |
| Stepwise heating | | |
| M 300 150° C./10 min. | 8.6 | 10.6 |
| 20 min. | 9.1 | 10.1 |
| 30 min. | 9.1 | 9.9 |
| 45 min. | 8.6 | 9.4 |
| F 150° C./30 min. | 24.0 | 23.5 |
| D 150° C./30 min. | 575 | 535 |
| H 150° C./30 min. | 62 | 63 |
| E 150° C./30 min. | 52 | 54 |

The accelerator MFD according to the invention used in combination with MBT shows the advantages over the comparison combination of HEXA/MBT already mentioned in Examples 1 and 2.

EXAMPLE 4

This demonstrates the influence of the accelerator MFD according to the invention on the colour of a transparent vulcanizate which has been prepared from the following components:

| | |
| --- | --- |
| styrene-butadiene rubber (SBR 1507) | 100.0 phr |

-continued

| | | |
|---|---|---|
| silica | 50.0 phr | |
| dicyclohexylamine (filler activator) | 1.0 phr | |
| naphthenic mineral oil | 5.0 phr | |
| stearic acid | 2.0 phr | |
| phenolic age resistor[1] | 1.0 phr | |
| zinc oxide | 1.8 phr | |
| sulphur | 1.8 phr | |
| ZMBT | 1.2 phr | |
| TMTD | 0.8 phr | |
| | 1.0 phr HEXA | 1.0 phr MFD |
| colour of the vulcanizate after vulcanization at 150° C./30 min. | brown | light |

[1]Vulkanox(Trade Mark) DS, Bayer AG was used.

It should be noted that DPG and DOTG are known from experience to discolour even more strongly than HEXA.

EXAMPLE 5

This shows results in a mixture based on styrene-butadiene rubber/polybutadiene having the following composition:

| | |
|---|---|
| SBR 1712 | 68.5 phr |
| polybutadiene[1] | 68.5 phr |
| carbon black N 220 | 95.0 phr |
| aromatic mineral oil | 20.0 phr |
| resin to impart adhesiveness[2] | 2.0 phr |
| stearic acid | 2.0 phr |
| ozone protective wax | 1.5 phr |
| IPPD | 1.5 phr |
| TMQ | 1.0 phr |
| Zinc oxide | 3.0 phr |
| sulphur | 1.8 phr |
| MBTS | 1.0 phr |

| | HEXA 0.50 phr | MFD 0.5 phr |
|---|---|---|
| prevulcanization time | | |
| $t_s$ (15)/130° C. | 12.5 | 10.0 |
| flow time $t_s$ (15)/160° C. | 1.8 | 1.8 |
| final vulcanization time | | |
| $t_{90}$/160° C. | 9.1 | 6.6 |
| reaction time | | |
| $t_{90}-t_s$/160° C. | 7.3 | 4.8 |
| tension M 300 160° C./ | | |
| 10 min. | 4.6 | 5.7 |
| 20 min. | 5.0 | 5.4 |
| 30 min. | 4.8 | 5.3 |
| 45 min. | 4.6 | 5.0 |
| tension M 300 180° C./ | | |
| 5 min. | 4.5 | 5.1 |
| 10 min. | 4.1 | 5.7 |
| 15 min. | 3.9 | 4.5 |
| F 160° C./20 min. | 13.7 | 12.1 |
| D 160° C./20 min. | 600 | 525 |
| H 160° C./20 min. | 62 | 62 |
| H 160° C./20 min. | 25 | 25 |

The substances used were
[1]Buna(Trade Mark)CB 30,
[2]Koresin

The accelerator MFD according to the invention affords the following advantages compared with HEXA which is used as comparison: a shorter final vulcanization time $t_{90}$, a shorter reaction time $t_{90}-t_s$ and higher tension values M 300.

TABLE 1

| | Test methods |
|---|---|
| Vulkameter | Bayer Vulkameter, heating for 1 minute, measuring range 3/20 mV, test duration at 160° C./30 min, rate of feed 600 mm/h |
| $t_s$ (15) | prevulcanization time from Vulkameter measurement at 120° C. or 130° C., time taken for the modulus of shear curve to rise above the minimum by 15 or 30 mm. |
| $t_{90}$ (min) | complete heating time, time until 90% of the maximum modulus of shear is reached (Bayer Vulkameter) |
| $t_{90}-t_s$ (min) | reaction time, difference between complete heating time $t_{90}$ and pre-vulcanization time $t_s$ measured at the same temperature (160° C.) |
| Stepwise heating $M_{300}$ (Mpa) | 4 mm flaps, heating in press. tension at 300% and 500% elongation, DIN 53504 |
| F (MPa) | tear resistance, DIN 53504, standard ring R 1 |
| D (%) | elongation at break, DIN 53504, standard ring R 1 |
| H (Shore A) | hardness Shore A, DIN 53504, standard Ring R 1 |
| E (%) | recoil elasticity, DIN 53512, 4 mm flaps |

| | Abbreviations | |
|---|---|---|
| MBT | = | 2-mercaptobenzothiazole |
| MBTS | = | dibenzothiazyl disulphide |
| HEXA | = | hexamethylene tetramine |
| MFD | = | tris-(dimethylamino-methylene)-melamine |
| DPG | = | diphenyl guanidine |
| DOTG | = | di-ortho-tolyl guanidine |
| ZMBT | = | zinc salt of 2-mercapto benzo-thiazole |
| CBS | = | 2-benzothiazyl-cyclohexyl sulphenamide |
| TBBS | = | 2-benzothiazyl-tertiary butyl-sulphenamide |
| MBS | = | 2-benzothiazyl-sulphene morpholide |
| DCBS | = | 2-benzothiazyl-dicyclohexyl sulphenamide |
| TMTD | = | tetramethylthiuramic disulphide |
| TMTM | = | tetramethylthiuramic mono-sulphide |
| ZDEC | = | zinc-N—diethyl-dithiocarbamate |
| TMQ | = | polymerized 2,2,4-trimethyl-1,2-dihydroquinoline |
| IPPD | = | N—phenyl-N'—isopropyl-p-phenylene diamine |
| OTOS | = | N—oxydiethylene-dithiocarbamyl-N'—oxydiethylene sulphenamide |

We claim:

1. A vulcanization accelerator for a rubber consisting of
(a) 0.1 to 2.0 parts by weight of a melamine derivative of the formula

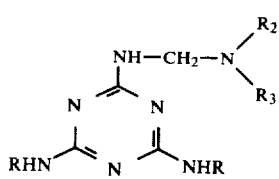

wherein R is hydrogen or

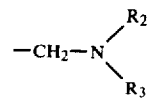

and $R_2$ and $R_3$, which may be identical or different, are hydrogen, a straight or branched chain $C_1-C_4$- alkyl or alkenyl group or a $C_3$–$C_7$, cycloalkyl group or $R_2$ and $R_3$ are linked through a $C_2$–$C_{12}$, alkylene bridge which may contain a hetero atom such as oxygen, sulphur or N-$C_1$-$C_4$, alkyl;

(b) 0.3–2.0 parts by weight of a thiazole accelerator and (c) 0.01–1.0 parts by weight of a conventional accelerator per 100 parts by weight of rubber.

2. A vulcanization accelerator for a rubber as claimed in claim 1 wherein $R_2$ and $R_3$, which may be identical or different, are hydrogen, a straight or branched chain $C_1$–$C_4$-alkyl or alkenyl group or a $C_5$–$C_6$ cycloalkyl group or $R_2$ and $R_3$ are linked through a $C_2$–$C_6$ alkylene bridge which may contain a hetero atom such as oxygen, sulphur or N-$CH_3$.

* * * * *